US011476779B2

(12) United States Patent
Atsuta

(10) Patent No.: US 11,476,779 B2
(45) Date of Patent: Oct. 18, 2022

(54) DRIVE CONTROL DEVICE, ELECTRONIC EQUIPMENT, DRIVE CONTROL METHOD, AND COMPUTER READABLE MEDIUM

(71) Applicant: CANON KABUSHIKI KAISHA, Tokyo (JP)

(72) Inventor: Akio Atsuta, Yokosuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 387 days.

(21) Appl. No.: 16/817,453

(22) Filed: Mar. 12, 2020

(65) Prior Publication Data

US 2020/0304042 A1 Sep. 24, 2020

(30) Foreign Application Priority Data

Mar. 22, 2019 (JP) ............................. JP2019-055665

(51) Int. Cl.
*H02N 2/14* (2006.01)
*G02B 7/09* (2021.01)

(52) U.S. Cl.
CPC ............... *H02N 2/147* (2013.01); *G02B 7/09* (2013.01)

(58) Field of Classification Search
CPC ...... H02N 2/147; H02N 2/126; H02N 2/0075; H02N 2/005; H02N 2/14; H02N 2/145; G02B 7/09; G02B 7/08
See application file for complete search history.

(56) References Cited

U.S. PATENT DOCUMENTS

2019/0005781 A1\* 1/2019 Kobayashi ............ G06F 1/3231

FOREIGN PATENT DOCUMENTS

JP 2013-123335 A 6/2013

\* cited by examiner

*Primary Examiner* — Emily P Pham
(74) *Attorney, Agent, or Firm* — Canon U.S.A., Inc. IP Division

(57) ABSTRACT

A drive control device includes: a vibration wave drive device that includes an elastic body, a vibration body including an electro-mechanical energy conversion element, and a contact body in contact with the vibration body, and a control unit of the vibration wave drive device. The drive control device includes: a first detector configured to detect an electric current that is supplied to the vibration wave drive device or consumed electric power, and a second detector configured to detect relative positions or relative speed of the vibration body and the contact body. A control mode in which the vibration wave drive device is decelerated on a basis of a detection result obtained by the first and/or the second detector is included.

25 Claims, 12 Drawing Sheets

DRIVE CONTROL DEVICE, ELECTRONIC EQUIPMENT, DRIVE CONTROL METHOD, AND COMPUTER READABLE MEDIUM

BACKGROUND OF THE INVENTION

Field of the Invention

The present disclosure relates to a control method of a vibration motor that causes an ultrasonic vibration body to generate a vibration wave and relatively moves a contact body, which is in contact with the ultrasonic vibration body, with use of friction force.

Description of the Related Art

A vibration motor that applies, to a vibration body obtained by sticking an electro-mechanical energy conversion element (for example, a piezoelectric element) to a metal piece, an AC signal, which has a frequency corresponding to a resonance frequency of the vibration body, to generate vibrations and move a contact body which is in contact with the vibration body has been known. When the contact body pressure-contacted with the vibration body is frictionally driven, strong driving force is generated, so that a digital camera, a video camera, and the like that use the vibration motor for AF drive or zoom drive are developed into products. The vibration motor is being used for drive of a stage by utilizing a feature of the vibration motor, such as a small size, high torque, or holding force.

Here, FIG. 16 illustrates a perspective view of a configuration of a vibration motor 200 as an example. A more specific configuration of a vibration motor is described in, for example, Japanese Patent Laid-Open No. 2013-123335 and the like, so that details thereof will be omitted. The vibration motor 200 includes an elastic body 201 formed of a material, such as metal, a vibration attenuation loss of which is small, and a vibration body including a piezoelectric element that is held between the elastic body 201 and a lower nut 204, and has a configuration in which an AC signal supplied from a flexible substrate 203 is applied. A contact body 207 receives thrust by vibrations of the vibration body and rotates, a gear 209 rotates with the rotation, and rotational force is output via the gear 209. Moreover, by using a screw at a desired part with a threaded hole which is provided in a fixing member 211, it is possible to attach the vibration motor 200 at a position desired by a user. A nut 212 fixes the fixing member 211 on a motor side.

FIGS. 17A and 17B are views each illustrating a configuration of a stage device that uses the conventional vibration motor 200.

FIG. 17A illustrates an example in which a stage is driven by using such a vibration motor. The rotational force of the vibration motor 200 is output by the gear 209. This motor output rotates a shaft (screw) 303, in which a screw thread is cut, via a gear train of a gear 301 and a gear 302. A driven body 304 moves by converting the rotation of the screw 303 to be in a linear movement direction. The driven body 304 moves on a guide 305. In such a manner, the guide 305 that supports the driven body 304 so as to be movable in this manner is included.

A stopper 306 has a function of regulating movement of the driven body 304 within a predetermined movement range so that the driven body 304 does not move farther than the movement range.

FIG. 17B is a view illustrating a state where the driven body 304 of the stage comes into contact with the stopper 306. Although the driven body 304 is normally designed so that the rotation of the shaft 303 stops when the driven body 304 comes into contact with the stopper 306, in a case where rotational force of the shaft 303 is large, the shaft 303 may continue rotating without stopping. As a result, the driven body 304 is further pushed and inclined and engagement with the screw 303 is also inclined, and, when the motor does not stop in this state, a problem that the device is broken is caused. Such a problem is caused when the driven body 304 is moved more quickly compared with mechanical rigidity of individual members.

Thus, it is necessary to judge contact between the driven body 304 and the stopper 306 and decelerate (stop) the vibration motor 200.

SUMMARY OF THE INVENTION

The present disclosure provides a drive control device and a drive apparatus that are capable of promptly decelerating (stopping) a vibration wave drive device even in a case where sudden load fluctuation is caused.

A drive control device that solves the aforementioned problem includes, a vibration wave drive device that includes an elastic body, a vibration body including an electro-mechanical energy conversion element, and a contact body in contact with the vibration body; a control unit of the vibration wave drive device; a first detector configured to detect an electric current that is supplied to the vibration wave drive device or consumed electric power; and a second detector configured to detect relative positions or relative speed of the vibration body and the contact body, in which a control mode in which the vibration wave drive device is decelerated on a basis of a detection result obtained by the first and/or the second detector is included.

Further features of the present disclosure will become apparent from the following description of exemplary embodiments with reference to the attached drawings.

According to the disclosure, it is possible to provide a drive control device that immediately decelerates (stops) a vibration wave drive device in response to load fluctuation.

DESCRIPTION OF THE EMBODIMENTS

A specific configuration of the disclosure will be described below with reference to drawings.

The disclosure of the present application provides a drive control device including: a vibration wave drive device that includes an elastic body, a vibration body including an electro-mechanical energy conversion element, and a contact body in contact with the vibration body; and a control unit of the vibration wave drive device.

The drive control device includes: a first detector configured to detect an electric current that is supplied to the vibration wave drive device or consumed electric power; and a second detector configured to detect relative positions or relative speed of the vibration body and the contact body. The drive control device is characterized in that a control mode in which the vibration wave drive device is decelerated on a basis of a detection result obtained by the first and the second detectors is included.

In accordance with mechanical rigidity of the drive control device or the number of times of detection, the control mode may be executed or controlled to be switched.

The disclosure is not limited to a specific configuration of each exemplary embodiment, which will be indicated below, modification may be added within a range of the gist of the disclosure, and such a configuration to which modification is added is also encompassed in the disclosure. Although a case where a drive control device and a drive apparatus are stopped will be mainly described in the exemplary embodiments below, the drive control device and the drive apparatus may be decelerated in order to avoid breakage or the like of the device or the apparatus. In this case, after the deceleration, the drive control device and the drive apparatus may be shifted to another stopping control, or may be naturally stopped by being free from control.

Moreover, the disclosure of the present application includes a program that causes the vibration wave drive device to execute each step of a drive control method described below. When the program is included in a desired computing unit, it becomes possible to start drive of the vibration wave drive device by remote control and perform automatic control by which the vibration wave drive device is safely decelerated and stopped.

First Exemplary Embodiment

Figure 1A:
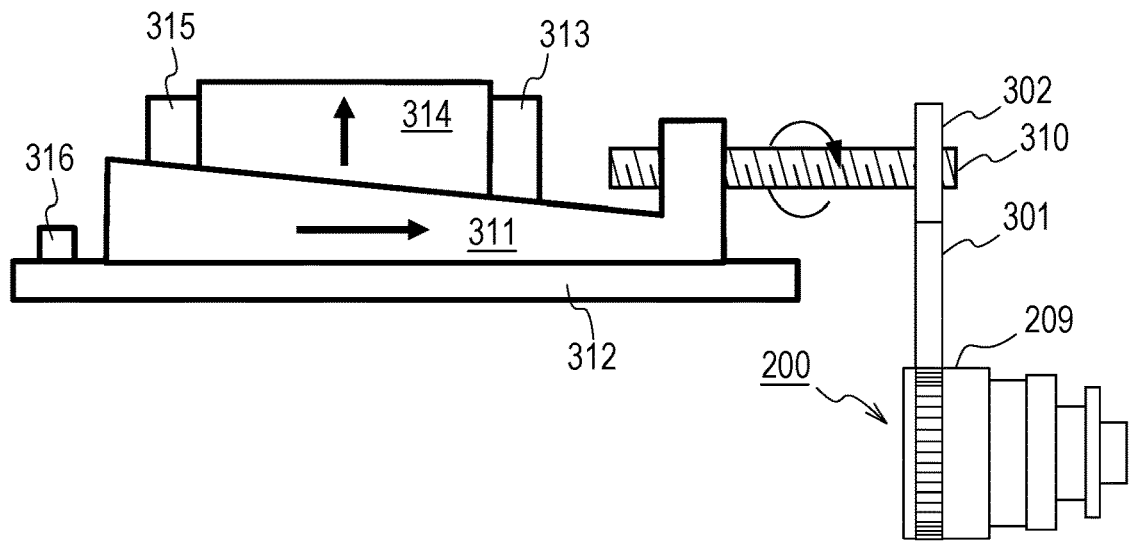
FIGS. 1A to 1C are views each illustrating a configuration of a drive apparatus that has a vibration motor according to a first exemplary embodiment of the present disclosure.
Figure 1B:
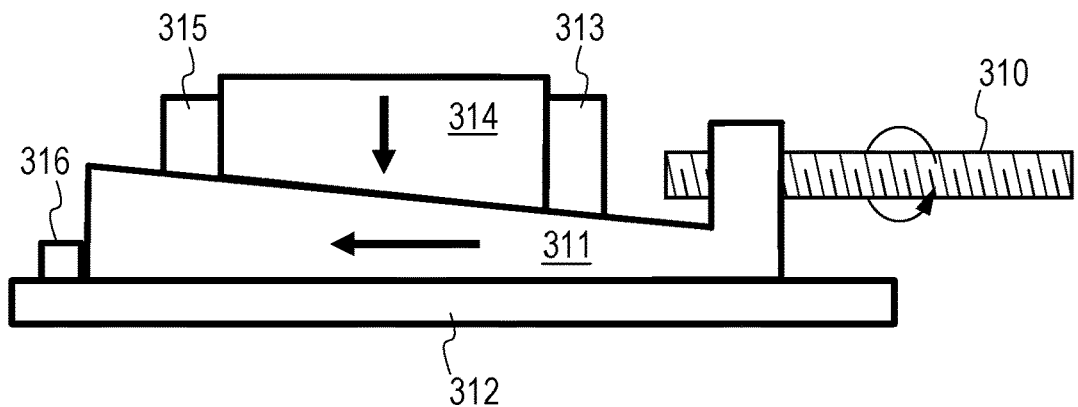
Figure 1C:
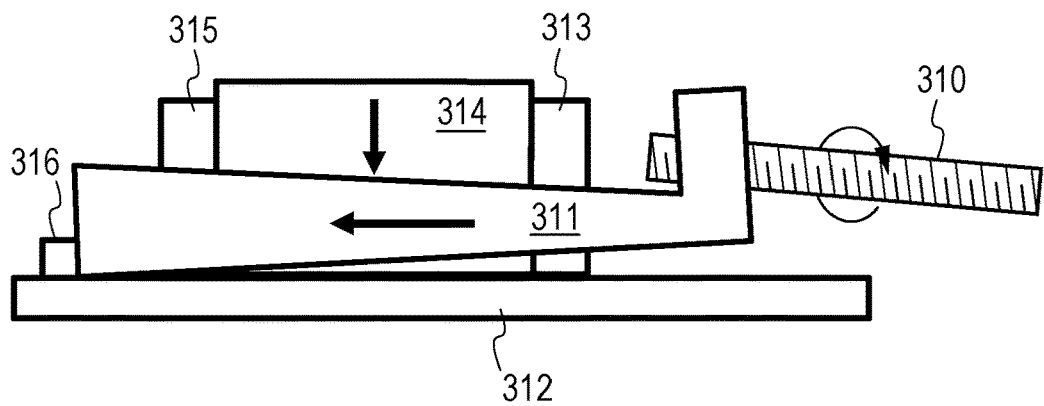

FIGS. 1A to 1C each illustrate a drive apparatus according to a first exemplary embodiment of the present disclosure that has a vibration wave drive device (vibration motor), which includes an electro-mechanical energy conversion element, as a motive power source. Motive power from a vibration motor 200 rotates a gear 310 via a gear train of a gear 209, a gear 301, and a gear 302. A screw thread is cut in the gear 310, and rotational force of the gear 310 is applied to a driven body 311 that has a mechanism by which the rotational force is converted into force in a linear movement direction. The driven body 311 is configured to be linearly movable in a right-and-left direction of a paper surface in the figures with rotation of the gear 310. With such a configuration, movement of a contact body that constitutes the vibration motor 200 and movement of the driven body 311 are linked.

Further, a guide 312 that guides the movement of the driven body 311 in the aforementioned right-and-left direction is provided, and a mechanism by which a vertically driven body 314 that is placed on the driven body 311 is vertically operated via a tapered portion is provided. Guides 313 and 315 are provided to regulate movement of the vertically driven body 314 in the right-and-left direction so that the vertically driven body 314 vertically moves in the figures, and arranged in a deep side of the paper surface so as not to hinder the movement of the driven body 311. With such a configuration, the vertically driven body 314 is displaced in a direction different from a movement direction of the driven body 311 with the movement of the driven body 311.

When the driven body 311 moves to a right side of the paper surface as illustrated in FIG. 1A, a higher side of an inclined surface of the driven body 311 and the vertically driven body 314 slide, so that the vertically driven body 314 moves in an upper direction in the figure. On the contrary, when the driven body 311 moves to a left side of the paper surface as illustrated in FIG. 1B, a lower side of the inclined surface of the driven body 311 and the vertically driven body 314 come into contact, so that the vertically driven body 314 moves in a lower direction in the figure. Here, a stopper 316 regulates the movement of the driven body 311 so that the driven body 311 does not move in a left direction of the paper surface further than the stopper 316.

In the apparatus, as illustrated in FIG. 1C, in a case where moving speed of the driven body 311 is fast, when the driven body 311 comes in contact with the stopper 316, force by which the driven body 311 is to be inclined is generated as a result, and even the vertically driven body 314 may be also inclined and moved.

Hereinafter, a characteristic configuration of the present exemplary embodiment, in which load fluctuation is detected and a stop operation dealing with the load fluctuation is performed, will be described.

Figure 2:
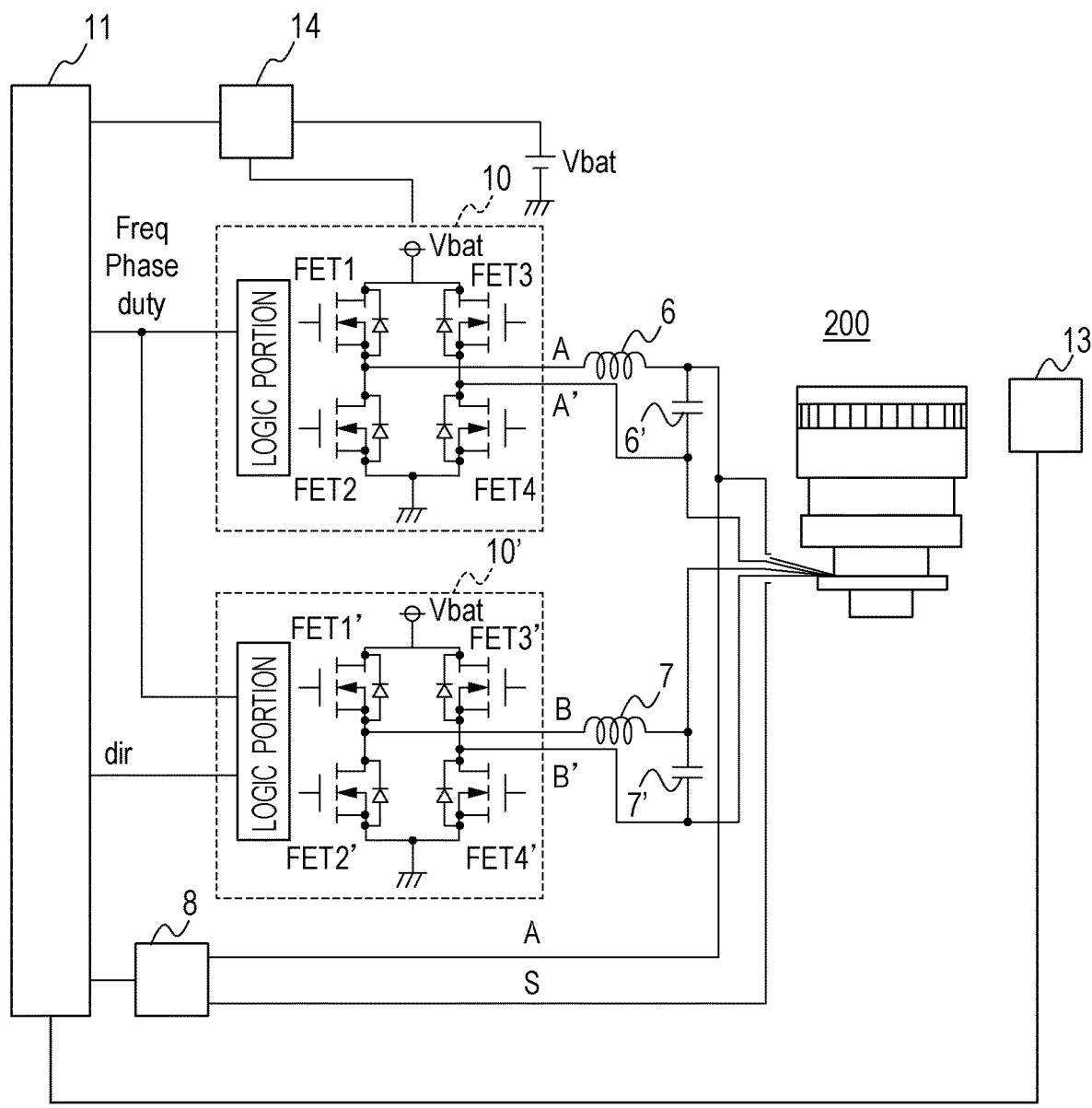
FIG. 2 is a view illustrating a configuration of a control circuit of the vibration motor according to the first exemplary embodiment of the present disclosure.

FIG. 2 is a view illustrating a configuration of a control circuit of the vibration wave drive device (vibration motor) of the first exemplary embodiment according to the disclosure. A microcomputer unit 11 calculates a control algorithm necessary for the present exemplary embodiment, controls a driving frequency and a phase difference of a two-phase AC signal to be applied, and a pulse width of a switching voltage, and controls a voltage, which is applied to the vibration motor 200, via switching circuits 10 and 10' and coils 6 and 7 (inductance units). A phase difference between one phase of the two-phase AC signal (signal A in the figure) and a signal S that is obtained from a detecting phase electrode (not illustrated) which is provided in the vibration motor 200 is detected by a phase difference detection unit 8.

A position detection unit 13 is a position detector configured to detect a rotation position of a rotation unit that is formed, for example, by a photo-interrupter and a slit plate. Positional and speed information of a rotation body are sent to the microcomputer unit 11 on the basis of a result obtained by the position detector 13, and the microcomputer unit 11 controls a rotation position and rotation speed of the vibration motor 200 in accordance with the positional and speed information of the rotation body. The speed may be obtained by calculating a time derivative for the detected positional information by the microcomputer unit 11.

A power source Vbat is connected to, for example, a battery, a cell, or the like. An electric current detection unit (electric current detector) 14 is provided with a detector configured to detect electric power (electric current) consumed by a voltage detector (not illustrated) of the power source Vbat and the switching circuits 10 and 10', a filter circuit, and the like.

With such a configuration, an electric current that is supplied to the vibration wave drive device 200 or consumed electric power that is consumed by the vibration wave drive device 200 is detected. Moreover, when control to keep a voltage to be applied constant is performed, a configuration may be provided so that the consumed electric power is calculated by detecting an electric current value and multiplying the electric current value by a known voltage value.

Figure 3:
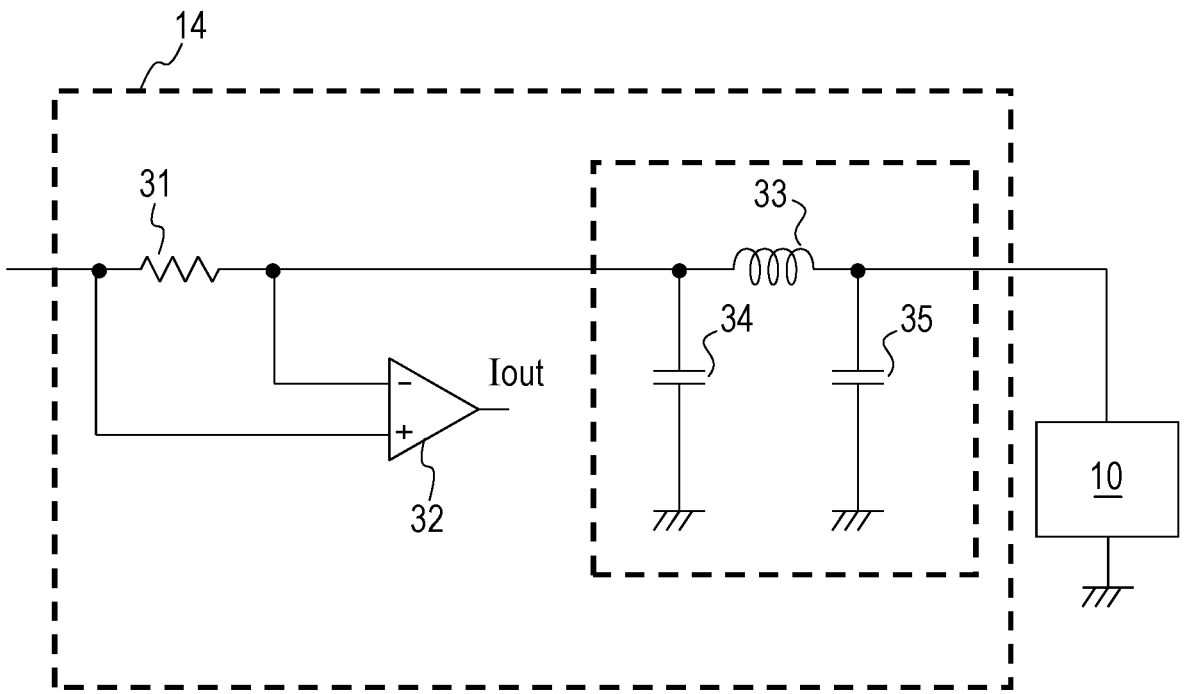
FIG. 3 is a view illustrating a circuit configuration of an electric current detection unit according to the first exemplary embodiment of the present disclosure.

FIG. 3 is a view illustrating a circuit configuration of the electric current detection unit 14 connected to the switching circuit 10. The electric current detection unit 14 is provided with a shunt resistor 31 by which an electric current is converted into a voltage and a differential amplifier 32 which detects a differential voltage generated by the shunt resistor 31, and an output voltage Tout of the differential amplifier 32 has a voltage value proportional to an electric current value. The output voltage Tout is input to the microcomputer unit 11 via an AD converter or the like. An impedance element 33 and capacitors 34 and 35 constitute a noise removal filter. When the filter is inserted, a waveform of an electric current is shaped and a signal having less noise is able to be obtained as a differential amplifier output, so that the filter may be provided. Note that, the filter is not essential to an electric current detection circuit and is also able to be omitted in a state where noise is less. In the present exemplary embodiment, change of torque of a vibration wave motor is detected on the basis of information obtained from the position detection unit 13 and the electric current detection unit 14. In this case, it is also possible to provide a configuration in which information of an electric power value is obtained by multiplying the electric current value obtained from the electric current detection unit 14 by a power source voltage.

Figure 4:
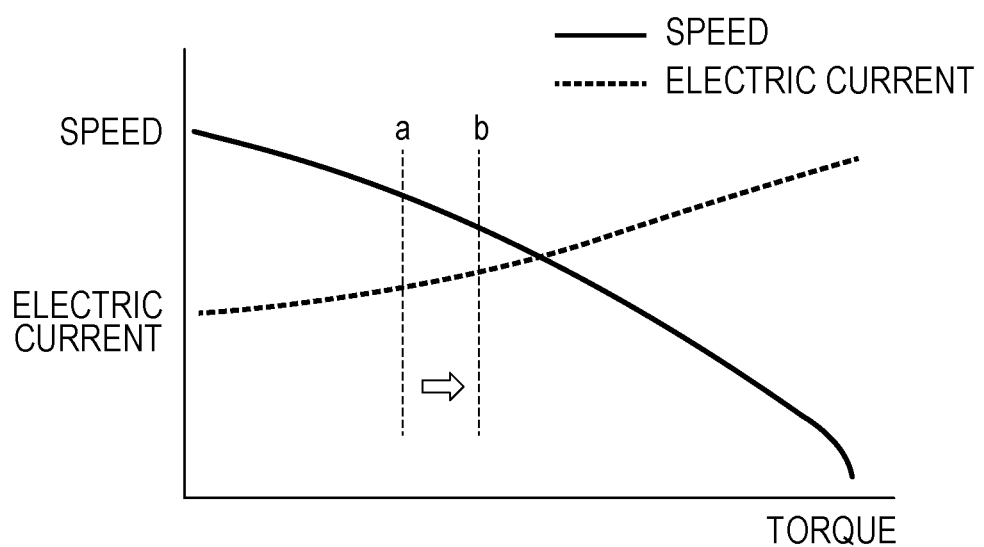
FIG. 4 is a view illustrating a relationship of load torque, speed, and an electric current in the configuration according to the first exemplary embodiment of the present disclosure.

FIG. 4 is a view illustrating a relationship of torque that is load applied to the contact body when the vibration motor 200 is operated, speed, and an electric current. Here, a driving frequency is substantially fixed at a certain frequency. Since a rotary motor is used as the vibration motor 200 in the present exemplary embodiment, load torque is used, but, in a case of a linear actuator that linearly operates, load itself, which is applied to a contact body of the actuator, may be used.

An increase in the torque of the vibration motor 200 in the present exemplary embodiment is equivalent to an increase in load when the driven body 311 is driven. Values of speed and an electric current when the vibration motor 200 is driven with certain load torque are indicated in a state a in FIG. 4 and a state where load torque higher than that of the state a is applied to the vibration motor 200 is a state b.

Figure 5:
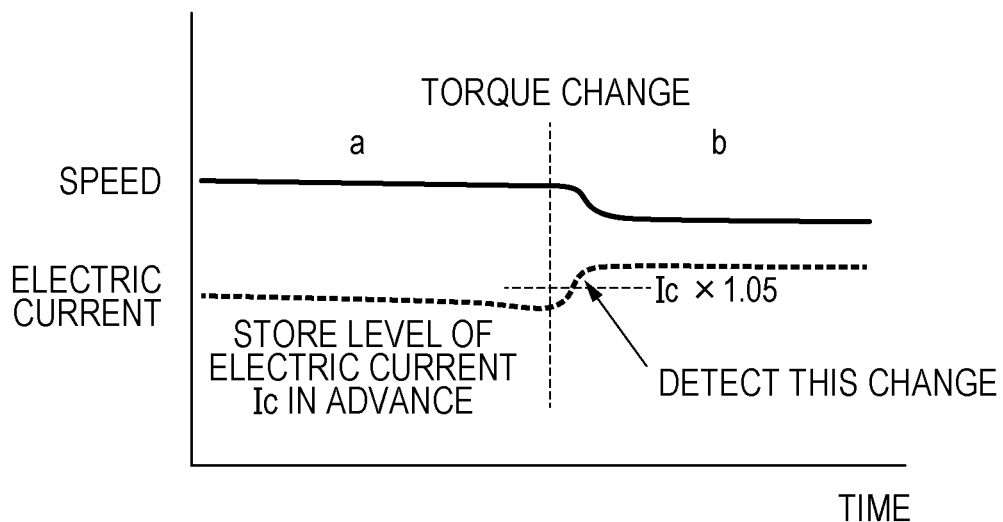
FIG. 5 is a view illustrating temporal change of relative speed and an electric current in the configuration according to the first exemplary embodiment of the present disclosure when load fluctuation is caused.
Figure 6:
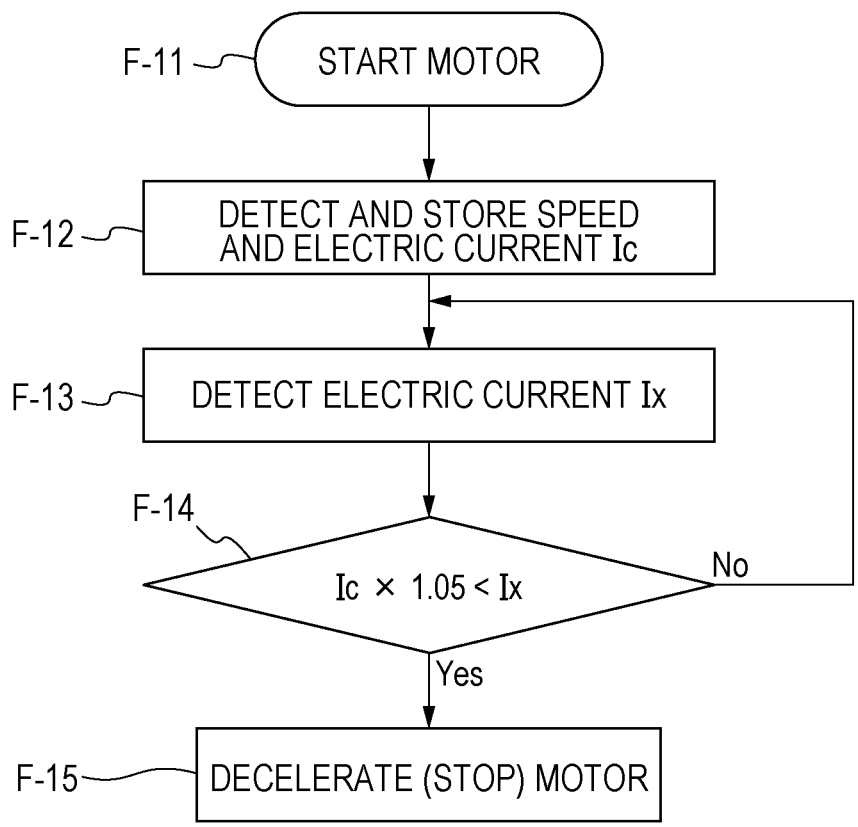
FIG. 6 is a flowchart illustrating a control algorithm according to the first exemplary embodiment of the present disclosure.

FIG. 5 is a view in which a horizontal axis indicates time and which illustrates temporal change of relative speed and an electric current when fluctuation of torque that results in load generated, for example, when the driven body 311 collides with the stopper 316 is caused. FIG. 6 is a flowchart illustrating a control algorithm. Hereinafter, the control algorithm according to the first exemplary embodiment will be described with reference to FIGS. 4 to 6.

First, the vibration motor 200 starts a motor in the state of the certain torque (state a in FIG. 4) with a driving frequency fixed (F-11 in FIG. 6). When the motor is started, relative positions of a vibration body and the contact body change and drive of the vibration motor 200 is started. Here, in a two-phase signal used for driving the vibration motor 200, a phase difference between an A phase and a B phase is set as, for example, 90°, and a pulse width of a switching pulse is set as, for example, 33%. The microcomputer unit 11 stores speed and an electric current value at this time in advance or while operating (F-12 in FIG. 6). Such a state corresponds to a driving state of the vibration wave motor until time when torque change in FIG. 5 is caused, and, in a state where load torque does not substantially change (increase), an electric current supplied from the power source Vbat does not substantially change (increase), either. A detected electric current Ix continuously maintains a state of Ix<Ic×1.05 (F-13 and F-14 in FIG. 6).

Here, when the load torque increases, a state changes from the state a to the state b of FIG. 4. At this time, speed is reduced and the electric current Ix which is input to the vibration motor 200 increases, so that Ic×1.05<Ix is provided.

The electric current Ix which is input to the vibration motor 200 increases here, because impedance characteristics of the vibration motor 200 change. Since an increase and a decrease of an electric current according to change of the impedance characteristics are well-known matters in a technique of an electric circuit, detailed description thereof will be omitted here. When the state changes from the state a to the state b due to the change of the torque, the speed and the electric current have values in a region of the state b in FIG. 5.

As above, the vibration motor 200 has a feature that speed thereof is reduced and a driving electric current increases in accordance with an increase in torque. In a case where an electric current value obtained by the electric current detector 14 exceeds a predetermined level of 5%, the microcomputer unit 11 decelerates the motor (F-15 in FIG. 6).

The motor may be stopped immediately after the deceleration or may be configured to be naturally stopped by being free from control.

Note that, a configuration may be provided with use of consumed electric power instead of an electric current.

With the aforementioned operation, continuous driving of the vibration motor 200 beyond a point of the torque change is suppressed, so that it becomes possible to stop the vibration motor 200 at an appropriate position, thus making it possible to suppress breakage or the like of the device. Although 5% (1.05 times) of the electric current Ic is set as a threshold, the percentage changes in accordance with speed and generated load at a time of load fluctuation, so that the percentage may be decided in accordance with a situation. In the algorithm illustrated in FIG. 6, change of the electric current is detected to thereby make determination to stop the vibration motor 200. When torque change is caused, speed is also reduced, so that a configuration in which this change is detected to thereby stop the vibration motor 200 is also able to be provided, or a configuration in which both of the change of the electric current and the change of the speed are observed may be also provided, as another method. Moreover, though a change amount of the electric current is detected as a way of detecting the torque change, the point of the torque change is able to be detected also by detecting an inclination of the change (derivative of the change of the electric current).

By detecting the torque change from the change of the electric current and/or the speed and stopping the vibration motor 200 in this manner, it becomes possible to operate the vibration motor 200 in an appropriate operation range.

Moreover, a rate (differential value) of change of the electric current or a rate (differential value) of change of the consumed electric power may be detected and, when a predetermined rate or more of the change is detected, the aforementioned control mode may be executed. Similarly, by detecting a rate of change of the relative positions of the vibration body and the contact body or a rate of change of the relative speed thereof, the aforementioned series of control mode of F-13, F-14, and F-15 may be executed.

Second Exemplary Embodiment

Figure 7:
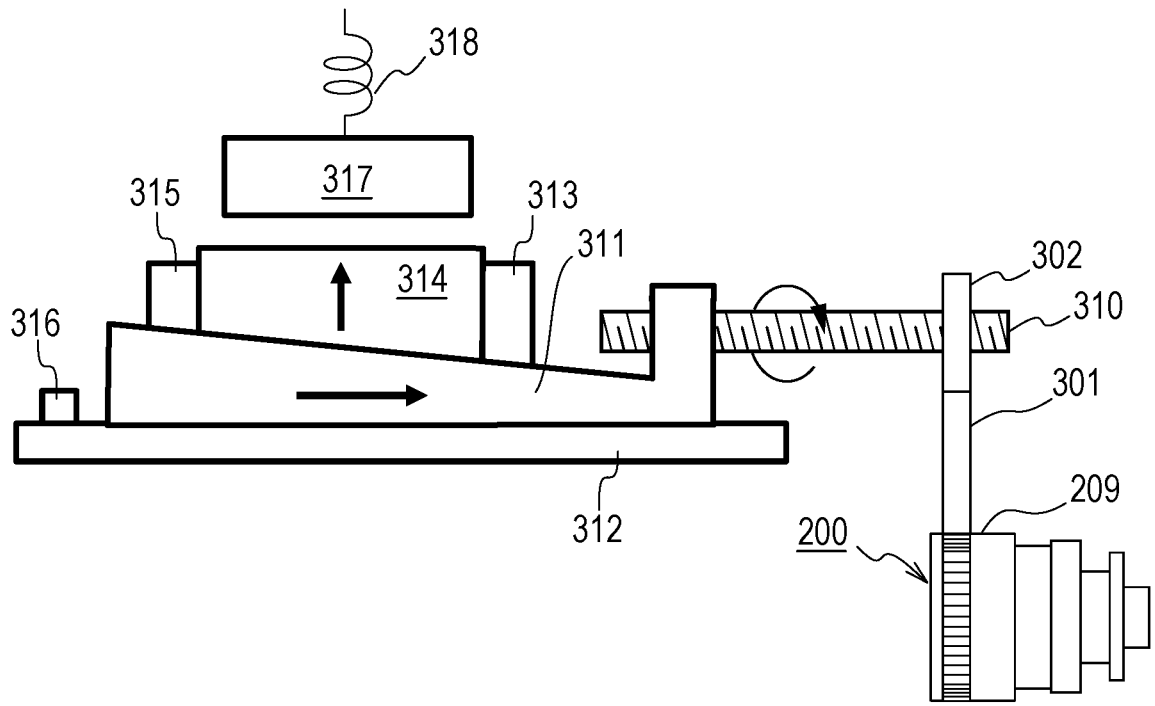
FIG. 7 is a view illustrating a configuration of a drive apparatus that has a vibration motor according to a second exemplary embodiment of the present disclosure.

Hereinafter, a second exemplary embodiment of the present disclosure will be described with reference to FIGS. 7 to 11. FIG. 7 illustrates a drive apparatus which is used in the second exemplary embodiment and has the vibration motor 200 as a motive power source.

A mechanism of the second exemplary embodiment is different from that of the first exemplary embodiment in a configuration in which a weight member 317 hung by a spring 318 is raised. In the first exemplary embodiment, change of relative speed and an electric current, which is caused when the driven body 311 collides with the stopper 316, is dealt with. The second exemplary embodiment is different in a configuration in which torque change between a state where the weight member 317 and a moving unit 314 are not in contact and a state where the moving unit 314 is in contact with and raises the weight member 317 is detected.

Figure 8:
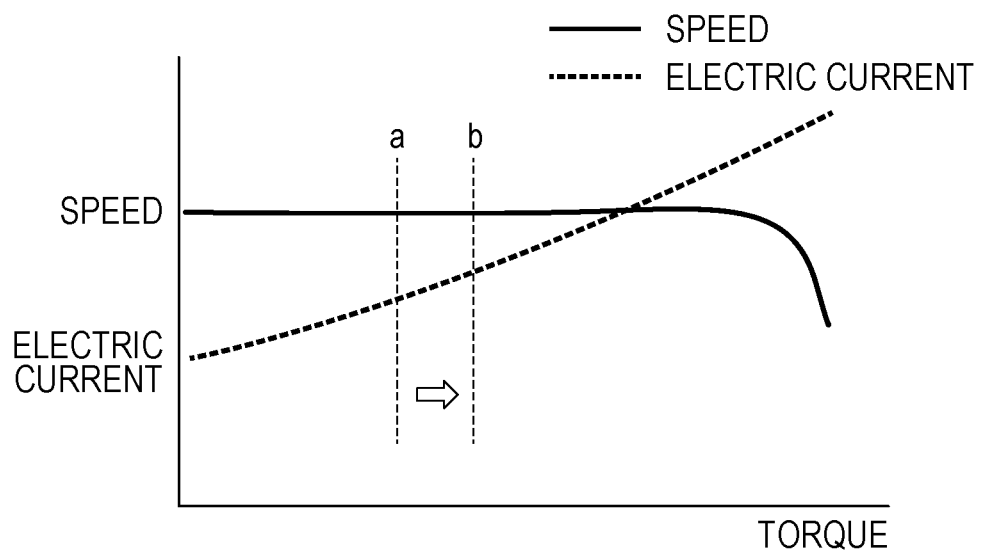
FIG. 8 is a view illustrating a relationship of load torque, speed, and an electric current in the configuration according to the second exemplary embodiment of the present disclosure.

FIG. 8 is a view illustrating a relationship of speed and an electric current relative to torque that results in load when the vibration motor 200 is operated in the configuration of the second exemplary embodiment. FIG. 8 illustrates a relationship in a case where a driving frequency is substantially fixed to a certain frequency.

Figure 9:
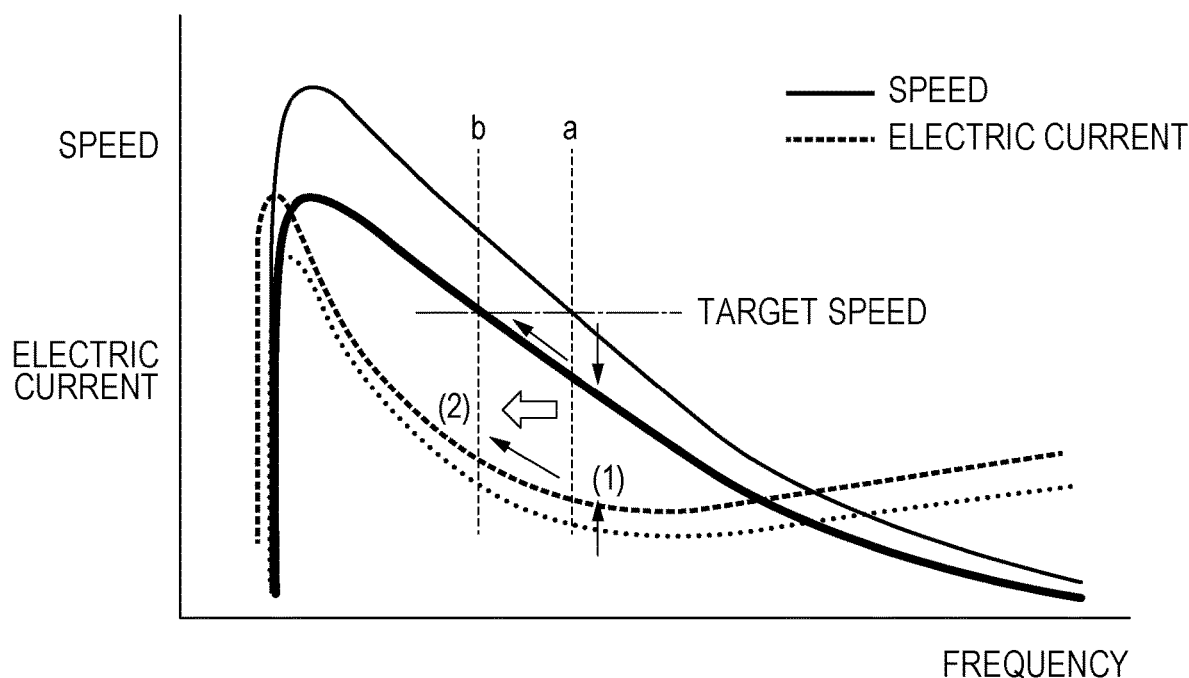
FIG. 9 is a view illustrating a relationship of speed and an electric current relative to a driving frequency in the configuration according to the second exemplary embodiment of the present disclosure.
Figure 10:
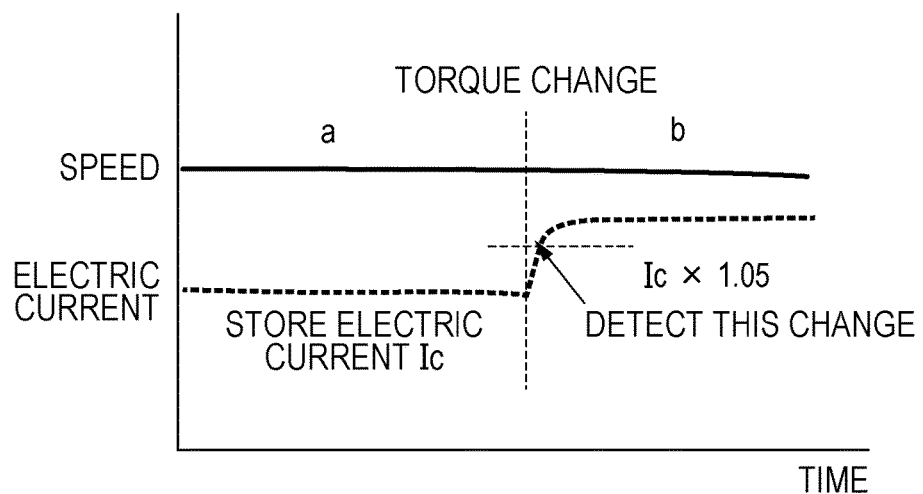
FIG. 10 is a view illustrating temporal change of relative speed and an electric current when load fluctuation is caused in the configuration according to the second exemplary embodiment of the present disclosure.
Figure 11:
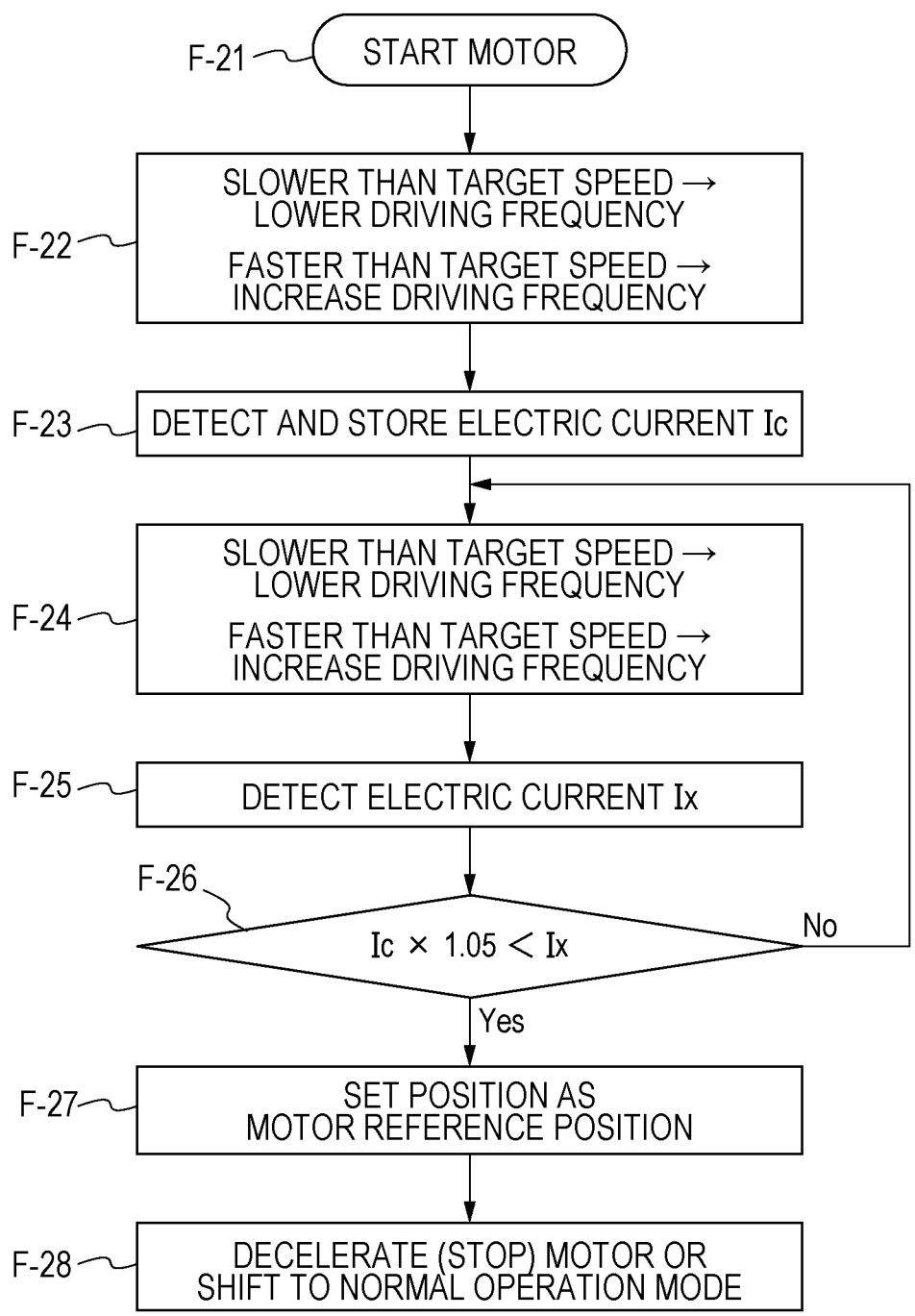
FIG. 11 is a flowchart illustrating a control algorithm according to the second exemplary embodiment of the present disclosure.

Here, the state a and the state b are set similarly to the first exemplary embodiment so that a state in which load torque is larger than load torque of the state a is the state b. FIG. 9 is a view illustrating a relationship of a driving frequency of an AC signal (AC voltage) applied to the electro-mechanical energy conversion element, speed, and an electric current, and explains control to make driving speed close to target speed. Moreover, profiles drawn with fine lines indicate speed and electric current characteristics before an increase in torque (state a) and profiles drawn with thick lines indicate speed and electric current characteristics after the increase in the torque (state b). FIG. 10 is a view in which a horizontal axis indicates time and which illustrates change of relative speed and an electric current when torque change, that is, load fluctuation is caused. FIG. 11 is a flowchart of a control algorithm of the second exemplary embodiment. First, the vibration motor 200 is operated in a state (state a in FIG. 8) of a predetermined load torque (F-21 in FIG. 11). When the motor is started, the relative positions of the vibration body and the contact body change, and drive of the vibration motor 200 is started. The vibration motor 200 is subjected to feedback control so that the driving speed thereof becomes the target speed. In a case where the driving speed is slower than the target speed, the driving frequency is lowered, and, in a case where the driving speed is faster, the driving frequency is increased.

Here, in the two-phase signal used for drive, the phase difference between the A phase and the B phase is set as, for example, 90°, and the pulse width of the switching pulse is set as, for example, 33%. The microcomputer unit 11 stores speed and an electric current value at this time in advance or while operating (F-22 and F-23 in FIG. 11).

Such a state corresponds to a driving state of the vibration wave motor until time when torque change is caused, and, in the state where load torque does not substantially change (increase), an electric current from the power source Vbat does not substantially change (increase), either.

Thereafter, the vibration motor 200 is continuously subjected to feedback control so that the driving speed thereof becomes the target speed. In the case where the driving speed is slower than the target speed, the driving frequency is lowered, and, in the case where the driving speed is faster, the driving frequency is increased.

As long as large load fluctuation is not caused, the detected electric current Ix continuously maintains the state of Ix<Ic×1.05. In this state, the vibration motor 200 has each of a speed value and an electric current value that correspond to those of the state a in FIG. 10. In a state where the load torque does not increase, change of the speed is also less, so that the detected electric current Ix continuously maintains the state of Ix<Ic×1.05 (F-24, F-25, and F-26 in FIG. 11). Then, when the driven body 311 moves in a right direction of the paper surface in FIG. 7 and the raised moving unit 314 and the weight member 317 come into contact, a state changes from the state a to the state b which are indicated in FIG. 8.

At a time of such transition from the state a to the state b, a shock is absorbed because of elasticity of the spring 318, so that moving speed of the driven body 311 in the right direction does not substantially change. On the other hand, the load torque increases.

Accordingly, as illustrated in FIG. 8, the speed does not substantially change, and only the electric current increases. The transition before and after occurrence of the torque change will be described below with reference to FIG. 9. A driving frequency before the load fluctuation (state a) is indicated by (1). Before the load fluctuation, the speed (fine solid line) and the electric current (fine dotted line) are drawn by the profiles as indicated in the figure. Similarly to the first exemplary embodiment, the microcomputer unit 11 stores a value of the electric current Ic at this time. In the state a, the speed changes on the fine solid line in the figure, and has already reached the target speed. Next, when the torque increases, the impedance characteristics of the motor change, and the speed and the electric current transit onto the profiles drawn by the thick lines in FIG. 9. The entire profile of the electric current "rises", and the entire profile of the speed "falls". Accordingly, while the electric current increases, the speed of the vibration motor 200 becomes slower than the target speed. Thus, the driving frequency is lowered by feedback control so that the speed reaches the target speed, and control is performed so that the speed reaches the target speed. The driving frequency in the state b when the speed reaches the target speed is indicated by (2) in the figure, and the electric current value further rises in accordance with control to lower the frequency (region of the state b in FIG. 10).

The microcomputer unit 11 detects the electric current Ix with respect to the electric current Ic before the torque change, and determines whether or not the electric current increases by 5% (F-26 in FIG. 11).

In a case where the electric current value obtained by the electric current detector 14 exceeds the value of the electric current Ic by 5%, the microcomputer unit 11 stores the exceeding position as a position at which the moving unit 314 and the weight member 317 come into contact (F-27 in FIG. 11). Thereafter, the aforementioned position is set as a reference position, and then, the motor is decelerated (stopped) or shifted to a normal operation mode (F-28 in FIG. 11). In this manner, when an increase in the torque is caused during feedback control for achieving the target speed, the driving frequency of the AC signal changes from (1) to (2), and the state transits from the state a to the state b. The change is detected by the electric current detector 14 and the motor is thereby promptly controlled. In the present exemplary embodiment, by performing feedback control for achieving the target speed, sensitivity for the change of the load torque is enhanced, so that it is possible to deal with even slight torque fluctuation which has small change of speed. Moreover, similarly to the first exemplary embodiment, the rate (differential value) of change of the electric current or the rate (differential value) of change of the consumed electric power may be detected and, when a predetermined rate or more of the change is detected, the aforementioned control mode may be executed. Similarly, by detecting the rate of change of the relative positions of the vibration body and the contact body or the rate of change of the relative speed thereof, the aforementioned control mode may be executed.

Third Exemplary Embodiment

Figure 12:
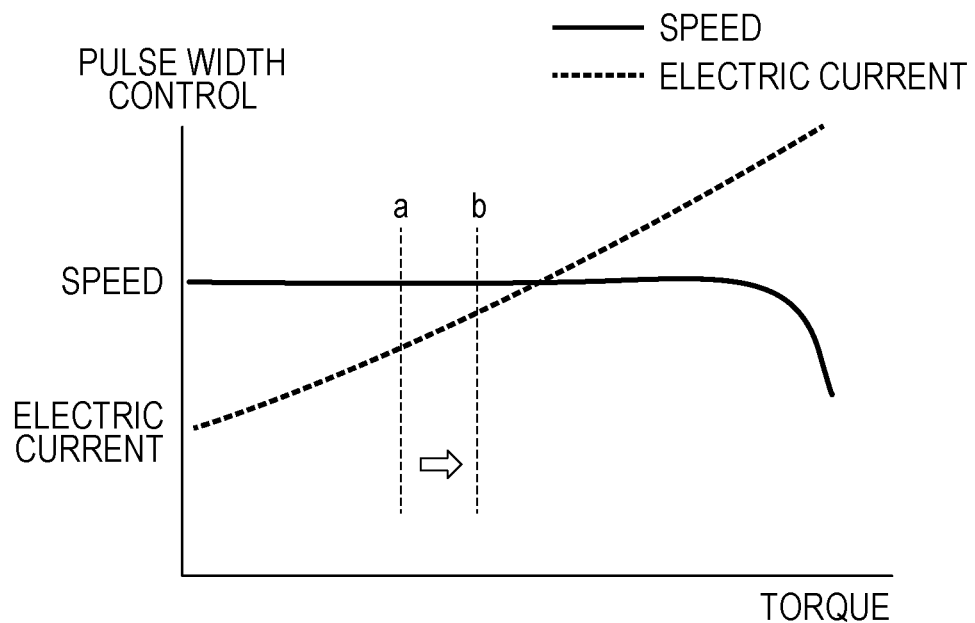
FIG. 12 is a view illustrating a relationship of load torque, speed, and an electric current according to a third exemplary embodiment of the present disclosure at a time of pulse width control.
Figure 13:
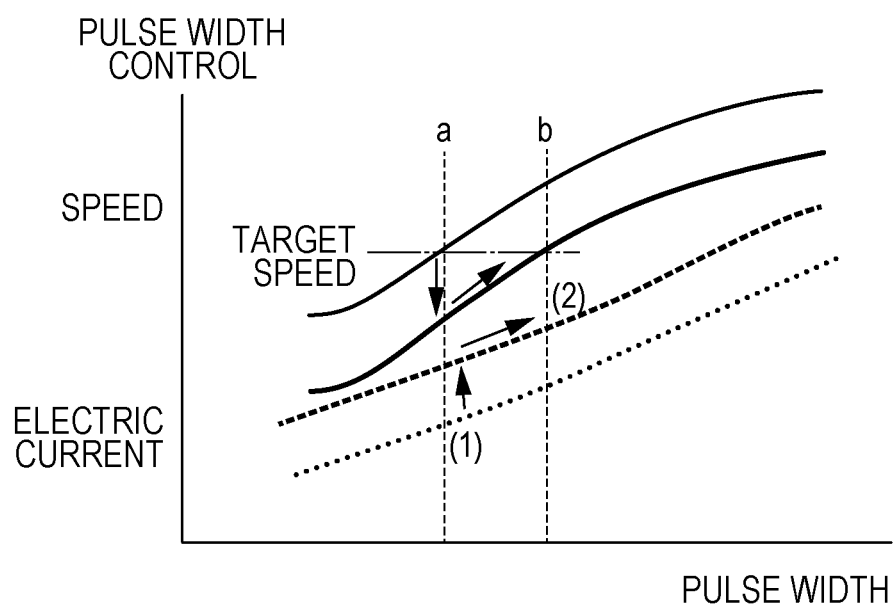
FIG. 13 is a view illustrating a relationship of speed and an electric current relative to a pulse width in a configuration according to the third exemplary embodiment of the present disclosure.

A third exemplary embodiment of the present disclosure will be described with reference to FIGS. 12 to 15. Since a configuration of a stage mechanism is the same as that of the second exemplary embodiment, description of the configuration of the device will be omitted. The third exemplary embodiment is different from the second exemplary embodiment in a method of feedback control for achieving the target speed. FIG. 12 is a view illustrating a relationship of torque that results in load which is generated due to driving pulse width (pulse duty) control of the present exemplary embodiment when the vibration motor 200 is operated, speed, and an electric current. Here, a driving pulse width is the pulse width of the switching pulse constituting the two-phase frequency signal, and, when the driving pulse width is set as 0 to 50% of the pulse duty, it is possible to change an effective voltage, thus making it possible to obtain an effect same as the one that is obtained by changing a voltage level of the switching pulse. FIG. 13 is a view for explaining a relationship of the pulse width, speed, and an electric current, and illustrates a situation where feedback control for reaching the target speed by pulse width control is performed.

Figure 14:
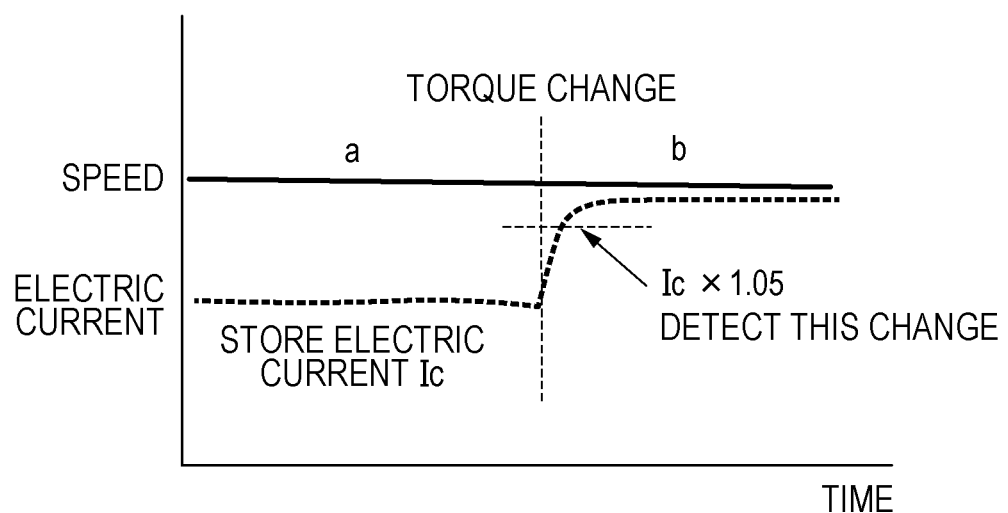
FIG. 14 is a view illustrating temporal change of relative speed and an electric current when load fluctuation is caused in the configuration according to the third exemplary embodiment of the present disclosure.
Figure 15:
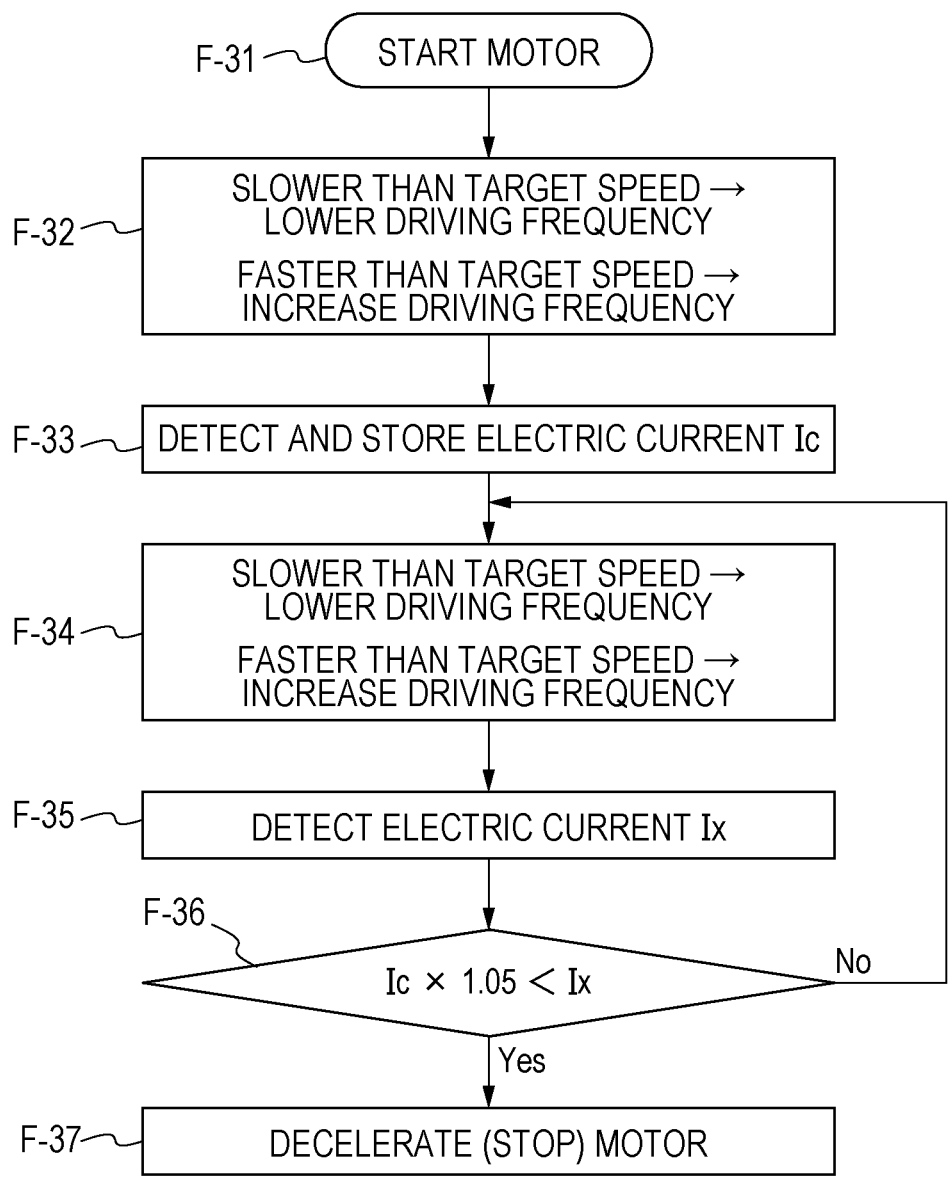
FIG. 15 is a flowchart of a control algorithm according to the third exemplary embodiment of the present disclosure.
Figure 16:
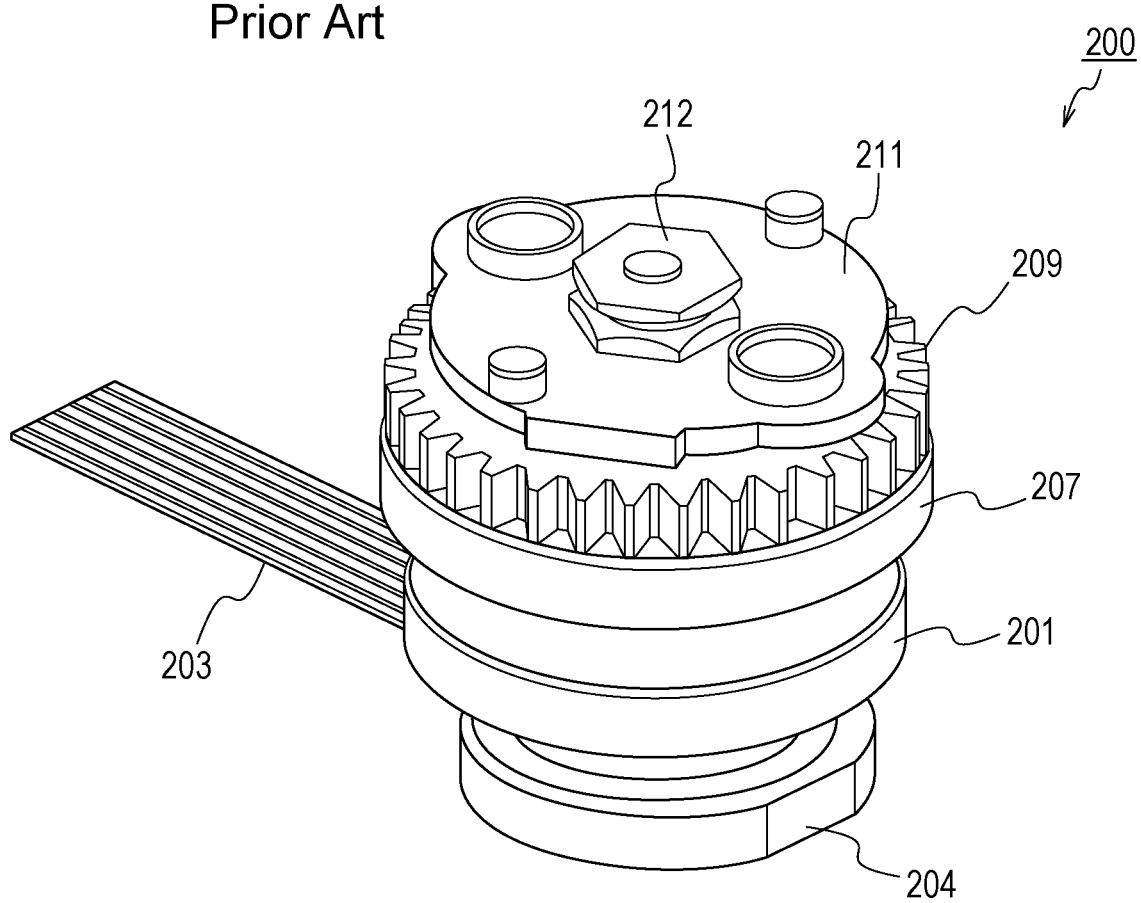
FIG. 16 is a perspective view of a conventional vibration motor.
Figure 17A:
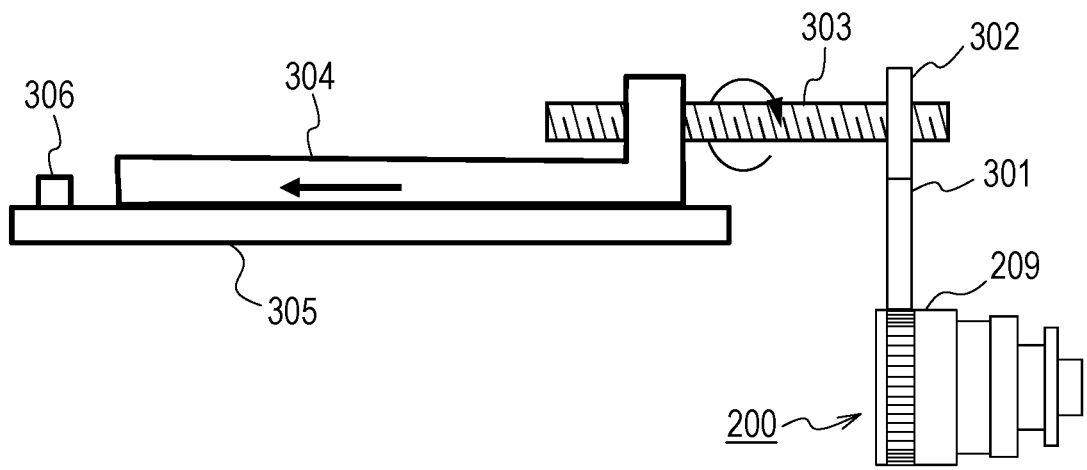
FIGS. 17A and 17B are views each illustrating a configuration of a stage device that uses the conventional vibration motor.
Figure 17B:
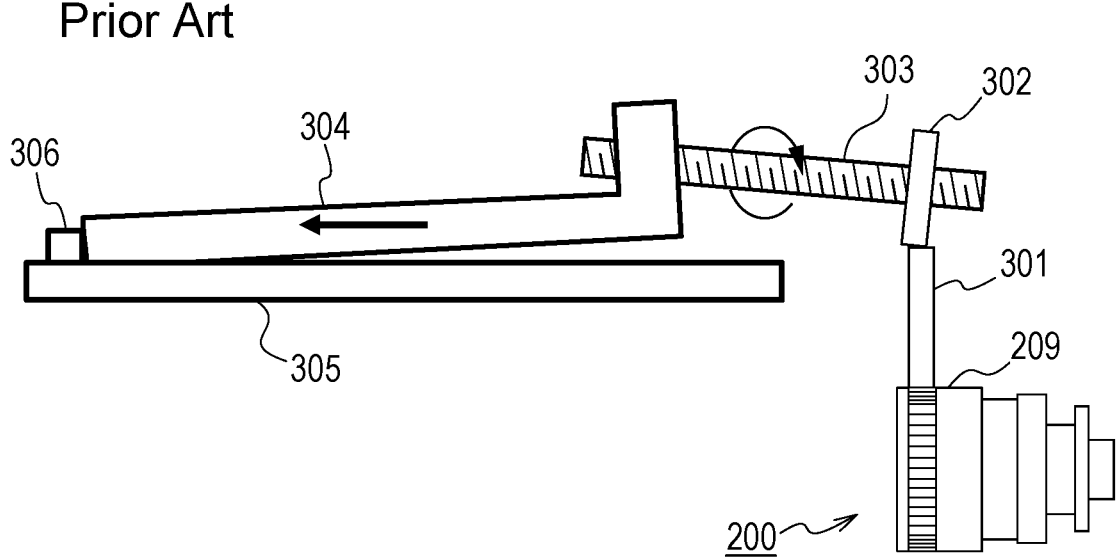

FIG. 14 is a view in which a horizontal axis indicates time and which illustrates change of relative speed and an electric current when torque change, that is, load fluctuation is caused, and FIG. 15 is a flowchart of a control algorithm in the configuration of the third exemplary embodiment.

First, the vibration motor 200 is operated in a state of a predetermined load torque (state a in FIG. 12) (F-31 in FIG. 15). Here, in the two-phase signal used for drive, the phase difference between the A phase and the B phase is set as, for example, 90°, and the pulse width of the switching pulse is set as, for example, 33%. The microcomputer unit 11 stores speed and an electric current value at this time in advance or while operating (F-32 in FIG. 15).

Such a state corresponds to a driving state of the vibration wave motor until time when torque change is caused, and, in the state where load torque does not substantially change (increase), an electric current from the power source Vbat does not substantially change (increase), either.

A detected electric current Ix continuously maintains a state of Ix<Ic×1.05 (F-34 and F-35 in FIG. 15). Here, when the load torque increases, a state changes from the state a to the state b which are indicated in FIG. 12.

In such a state, the speed of the vibration motor 200 does not substantially change, and only the electric current thereof increases.

FIG. 13 is a view illustrating the relationship of the pulse width, the speed, and the electric current in the vibration motor 200, and is a view illustrating transition before and after the torque change is caused and illustrating the situation where feedback control for achieving the target speed by pulse width control of the present exemplary embodiment is performed. At a time of such transition from the state a to the state b, a shock is absorbed because of the elasticity of the spring 318, so that the moving speed of the driven body 311 in the right direction does not substantially change.

A value of the pulse width before the load fluctuation (state a) is indicated by (1). Before the load fluctuation, the speed (fine solid line) and the electric current (fine dotted line) are drawn by the profiles as indicated in the figure. Similarly to the first exemplary embodiment, the microcomputer unit 11 stores a value of the electric current Ic at this time. In the state a, the speed changes on the fine solid line, and has already reached the target speed. Next, when the torque increases, the impedance characteristics of the motor change, and the speed and the electric current transit onto the profiles drawn by thick lines in FIG. 12. The entire profile of the electric current "rises", and the entire profile of the speed "falls". Then, while the electric current increases, the speed of the vibration motor 200 becomes slower than the target speed. Thus, the driving frequency is controlled by feedback control so that the speed reaches the target speed, by increasing the pulse width so that the speed reaches the target speed.

The pulse width in the state b when the speed reaches the target speed is indicated by (2) in the figure, and the electric current value further rises in accordance with control to increase the pulse width (region of the state b in FIG. 14 and F-34 in FIG. 15).

The microcomputer unit 11 detects the electric current Ix with respect to the electric current Ic before the torque change, and determines whether or not the electric current increases by 5% (F-36 in FIG. 15).

In a case where the electric current value obtained by the electric current detector 14 exceeds the value of the electric current Ic by 5%, the microcomputer unit 11 stops the motor (F-37 in FIG. 15).

In this manner, when an increase in the torque is caused during feedback control for achieving the target speed, the pulse width of the AC signal changes from (1) to (2), and the state transits from the state a to the state b.

The change is detected by the electric current detector 14 and the motor is thereby promptly controlled. Also in the present exemplary embodiment, by performing feedback control for achieving the target speed similarly to the second exemplary embodiment, sensitivity for the change of the load torque is enhanced, so that it is possible to deal with even slight torque fluctuation which has small change of speed. Moreover, in the present exemplary embodiment, the motor may be stopped at a time point of detecting the increase in the torque and the stopping position may be set as a reference point. Alternatively, without stopping the motor, a position of the motor may be set as the reference point.

The disclosure is able to be suitably used for a stage or various kinds of electronic equipment.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-055665, filed Mar. 22, 2019, which is hereby incorporated by reference herein in its entirety.

What is claimed is:

1. A drive control device comprising:
   a vibration wave drive device that includes an elastic body, a vibration body including an electro-mechanical energy conversion element, and a contact body in contact with the vibration body;
   a control unit of the vibration wave drive device;
   a first detector configured to detect an electric current that is supplied to the vibration wave drive device or consumed electric power; and
   a second detector configured to detect relative positions or relative speed of the vibration body and the contact body, wherein a control mode in which the vibration wave drive device is decelerated on a basis of a detection result obtained by the first and/or the second detector is included.

2. The drive control device according to claim 1, wherein the vibration wave drive device is decelerated when an increase in load is detected on a basis of the detection result.

3. The drive control device according to claim 2, wherein the relative positions of the vibration body and the contact body, at which the increase in the load is detected, are stored as a reference point.

4. The drive control device according to claim 1, wherein the vibration wave drive device is decelerated when an increase in the electric current or the consumed electric power is detected or when reduction in the relative speed is detected.

5. The drive control device according to claim 1, wherein a rate of change of the electric current or a rate of change of the consumed electric power is detected.

6. The drive control device according to claim 1, wherein a rate of change of the relative positions of the vibration body and the contact body or a rate of change of the relative speed thereof is detected.

7. The drive control device according to claim 1, wherein a driving frequency of a voltage applied to the vibration wave drive device is kept and the control mode is executed.

8. The drive control device according to claim 1, wherein control by which the relative speed is made close to target speed is executed and the control mode is executed.

9. The drive control device according to claim 8, wherein the relative speed is made close to the target speed by controlling a driving frequency of a voltage applied to the vibration wave drive device or a pulse width of the applied voltage.

10. The drive control device according to claim 1, wherein the electric current is supplied to the vibration wave drive device from a power source via a shunt resistor and a differential voltage by the shunt resistor is detected.

11. A drive apparatus comprising:
    a drive control device including,
    a vibration wave drive device that includes an elastic body, a vibration body including an electro-mechanical energy conversion element, and a contact body in contact with the vibration body,
    a control unit of the vibration wave drive device,
    a first detector configured to detect an electric current that is supplied to the vibration wave drive device or consumed electric power, and
    a second detector configured to detect relative positions or relative speed of the vibration body and the contact body, wherein a control mode in which the vibration wave drive device is decelerated on a basis of a detection result obtained by the first and/or the second detector is included; and
    a driven body movement of which is linked with movement of the contact body.

12. The drive apparatus according to claim 11, further comprising:
    a guide that supports the driven body so as to be movable; and
    a stopper that regulates a movement range of the driven body.

13. The drive apparatus according to claim 11, further comprising:
    a mechanism that is displaced in a direction different from a movement direction of the driven body in accordance with movement of the driven body.

14. The drive apparatus according to claim 13, wherein the mechanism includes a spring and a weight and changes load applied to the driven body.

15. The drive apparatus according to claim 11, wherein the driven body is configured so as to be linearly movable.

16. The drive apparatus according to claim 11, wherein the vibration wave drive device in the drive control device is a rotary motor, and a mechanism that converts rotation into linear movement is included.

17. A stage comprising:
    a stage mechanism; and
    the drive apparatus according to claim 11,
    wherein the drive apparatus is configured to control the stage mechanism.

18. Electronic equipment comprising:
    a member; and
    the drive apparatus according to claim 11,
    wherein the drive apparatus is configured to control the member.

19. A drive control method comprising:
    a step of starting drive of a vibration wave drive device that includes an elastic body, a vibration body including an electro-mechanical energy conversion element, and a contact body in contact with the vibration body;

a first detecting step of detecting an electric current that is supplied to the vibration wave drive device or consumed electric power;

a second detecting step of detecting relative positions or relative speed of the vibration body and the contact body; and a step of decelerating the vibration wave drive device on a basis of a detection result obtained at the first and/or the second detecting step.

20. The drive control method according to claim 19, wherein the vibration wave drive device is decelerated when an increase in load is detected on a basis of the detection result.

21. The drive control method according to claim 19, further comprising:

a step of storing the relative positions of the vibration body and the contact body, at which an increase in load is detected, as a reference point.

22. The drive control method according to claim 19, wherein the vibration wave drive device is decelerated when an increase in the electric current or the consumed electric power is detected or when reduction in the relative speed is detected.

23. The drive control method according to claim 19, wherein a rate of change of the electric current or a rate of change of the consumed electric power is detected.

24. The drive control method according to claim 19, wherein a rate of change of the relative positions of the vibration body and the contact body or a rate of change of the relative speed thereof is detected.

25. A non-transitory computer readable medium that records therein a program by which a vibration wave drive device that includes an elastic body, a vibration body including an electro-mechanical energy conversion element, and a contact body in contact with the vibration body is caused to execute each step of the drive control method according to claim 19.

* * * * *